United States Patent
Lund (10) Patent No.: US 6,759,969 B2
(45) Date of Patent: Jul. 6, 2004

(54) FIBEROPTIC TRANSCEIVER SYSTEM (75) Inventor: Stephen Lund, Cary, NC (US)

(73) Assignee: Tuthill Corporation, Burr Ridge, IL (US)

( * ) Notice: Subject to any disclaimer, the term of this patent is extended or adjusted under 35 U.S.C. 154(b) by 388 days.

(21) Appl. No.: 09/872,835

(22) Filed: Jun. 1, 2001

(65) Prior Publication Data

US 2002/0181566 A1 Dec. 5, 2002

(51) Int. Cl.[7] ............................................... G01F 1/72
(52) U.S. Cl. ........................ 340/870.02; 340/870.25; 702/45
(58) Field of Search ................... 340/870.02, 870.25, 340/870.21, 870.28, 870.26, 870.18, 870.29; 73/32 A, 861.356, 861.06, 861.04, 861.355; 702/45, 77

(56) References Cited

U.S. PATENT DOCUMENTS

| | | | | |
|---|---|---|---|---|
| 4,242,666 A | * | 12/1980 | Reschovsky et al. | .. 340/870.28 |
| 4,537,081 A | * | 8/1985 | Max | ........................ 73/861.77 |
| 4,851,666 A | * | 7/1989 | Anderson et al. | ....... 250/231.13 |
| 6,281,731 B1 | * | 8/2001 | Fifield et al. | ............... 327/205 |

* cited by examiner

Primary Examiner—Michael Horabik
Assistant Examiner—Hung Dang
(74) Attorney, Agent, or Firm—Barnes & Thornburg (57) ABSTRACT

A fiberoptic transceiver system for use in an industrial paint spraying apparatus where analog information from flow sensors in the flow meter on the spray head is converted to a single channel digital signal for transmission on a fiberoptic cable to a receiver for decoding into an analog signal representing flow rate and a signal indicating flow direction. The encoding of two signals onto one channel is accomplished by encoding the flow rate as the frequency of the digital signal and the direction as the pulse width. The direction of the flow is determined by comparing the two analog signals from the flow meter and determining which signal is lagging the other.

33 Claims, 6 Drawing Sheets

FIBEROPTIC TRANSCEIVER SYSTEM

FIELD OF THE INVENTION

The invention described herein relates to the field of flow meters, and more particularly to flow meters used in industrial paint spraying apparatus. More particularly, it relates to a method and apparatus for communicating two channels of flow meter information from the spray head along a single optical fiber cable from the metering apparatus mounted on the spray head to a unit located remote from the spray head, which may then provide two channels of output for interfacing with a system controller for controlling the industrial spraying apparatus.

BACKGROUND OF THE INVENTION

In industrial spraying apparatus, it is desirous to have sensors mounted in the spray head as opposed to elsewhere in the dispensing circuit, in order to accurately measure the rate of flow of the fluid being dispensed from the spray head.

The known industrial painting systems use electrostatic means to charge the paint to reduce waste and improve coverage during the painting operation. The historical use of solvent based paints, which are non-conductive, allowed the use of a conventional wired transmitter on the flow meter in the spray head. Due to environmental and other concerns, the paint industry is moving toward the use of water based paints, which are inherently conductive. With water based paints the flow meter can no longer be grounded as in the prior art spray apparatus, as this would short-circuit the electrostatic charging voltage. The use of a fiber-optic interface between the flow meter and the other electronics of the dispensing system allows the meter to be electrically "floated" while the fiber optic cable isolates the receiver and control electronics from any voltage that may be present on the flow meter due to its location on the spray head. This system although initially designed for industrial spray painting systems could have other applications where dielectric isolation of the spray head and meter and intrinsic safety are important.

Presently, there are two systems on the market that use a fiber optic cable to transmit flow rate information from a flow meter on a spray head to a system controller. Among other differences, neither system allows for transmission of quadrature signals or two channels of information on one fiber optic channel and neither provides flow direction information, which allows for detection of a leaking or malfunctioning valve in the industrial spraying system.

SUMMARY OF THE INVENTION

Broady described, the invention herein is a method and apparatus for sensing the rate and direction of a moving body by generating two signals, converting rate and direction information into a single signal capable of being transmitted along a single communications channel, and reconstructing said rate and direction information after transmission.

In the particular application described in the preferred embodiment, the invention described herein is a method and apparatus for transmitting flow rate and direction information from a flow meter to a system controller by converting analog signals into a digital signal transmitted by pulses of light through a single optical fiber to a receiver, where the information is regenerated into conventional two channel quadrature signals suitable for input into a system controller. The apparatus, having both a transmitter section and a receiver section, may be referred to as a transceiver. The apparatus is specifically designed for industrial spray painting systems, but may be applied to other applications.

In general, the spraying apparatus employs a spray head integrating a flow meter or with a flow meter attached thereto. The flow meter includes at least two sensors that generate quadrature signals which are fed to a transmitter for transmission along a single communication channel to a receiver unit which receives and processes the signal for use by a system controller that controls the amount of fluid sprayed from the spray head. The flow meter is associated with a transmitter to encode the signals received from the sensors into light pulses. The communication channel used herein is a fiber optic cable which transmits the light pulses to the receiving unit which then converts the digital light pulses into electromagnetic signals usable by the controller electronics. The pulses of light encode the quadrature signals from the sensors so that the light pulse frequency represents the rotation rate of the gears as sensed by the sensors, and the pulse width represents the direction of rotation of the meter gears or flow through the meter.

DETAILED DESCRIPTION OF THE PREFERRED EMBODIMENT

Figure 1:
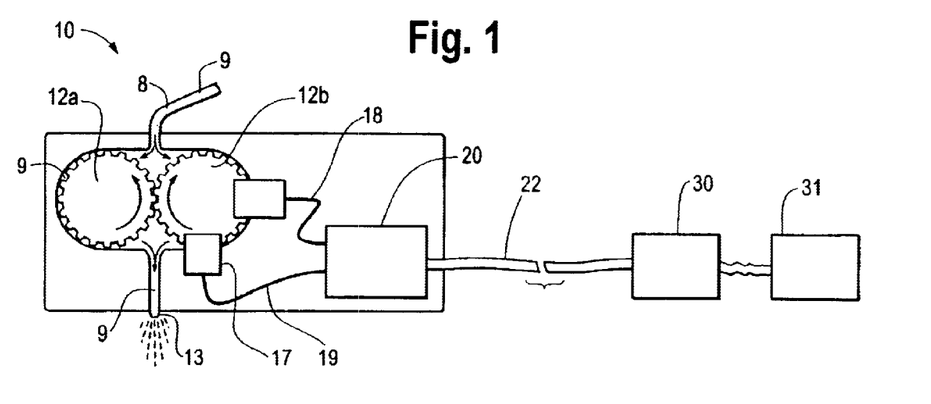
FIG. 1 is a block diagram showing the main components of the fiber optic transceiver system.

With reference to FIG. 1, flow meter 10 includes an input port 8, by which fluid may flow into the flow meter 10 and flow thru the flow meter 10 in a flow path 9. The fluid moving along flow path 9 in the flow meter 10 at the spray head turns metallic spur gears 12a and 12b of the flow meter 10 before being expelled at a spray nozzle 13. One familiar with flow meters will recognize that the diagram does not show the components in detail, and will further recognize that many types of flow meters may be used, such as piston meters, oval gear meters, and other types where speed and direction of rotation is sensed by electromagnetic sensors. A first sensor 16 and a second sensor 17 are positioned in proximity to the teeth of the spur gear 12b, and as the teeth rotate, the sensors 16 and 17 experience a changing magnetic field. The sensors 16 and 17 convert this information into an analog electrical signal. Two sensors are used in order to determine the direction of the flow of the fluid. The sensors 16 and 17 are positioned about the spur gear 12*b* so that the signal generated by one sensor is 90 degrees out of phase with respect to the signal generated by the other. Thus, while the first sensor 16 generates a peak signal, the second sensor 17 generates a rising signal. The situation is reversed if the flow is reversed, thus allowing determination of direction. It is not necessary that the sensors read the same spur gear, so long as the signals generated are out of phase with each other, preferably by 90 degrees. Thus, the first sensor 16, may be placed to read spur gear 12*a* and the second sensor 17 placed to read spur gear 12*b*.

The signals from the sensors 16 and 17 are conveyed along wires 18 and 19 to an electronics module 20 to produce digital signals for transmission to a receiver unit 30. The electronics module 20 includes circuits to encode flow rate and direction information into a digital signal and includes a transmitter section to pulse an LED, whereby the signal is transmitted along a single fiber optic cable 22. The information is encoded so that the frequency of the light pulses are proportional to the flow rate through flow meter 10, and the width of the individual pulses indicates direction of flow through the flow meter 10. It is preferred that the fiber optic cable be of a plastic fiber as opposed to glass, as a plastic fiber allows for a smaller bending radius and does not break as easily. A fiber optic cable 22 having a bend radius of at least 6 inches is preferred. One such cable is a $980/1000$ um plastic fiber encased in ½ inch outside diameter polyethylene pneumatic tubing. A glass cable may be used, particularly when the signal is in the infrared band. As fiber optic cables carry both visible light and infrared, the LED may be one that produces visible light or infrared. Therefore, as "light pulse" 13 used here, it should be understood to refer to both visible light and infrared portions of the electromagnetic spectrum. It is preferred that the LED emit light having a wave length of 660 nanometers. Additionally, with the teachings for the transceiver described herein, one skilled in the art would recognize that a transmitter and receiver pair, properly constructed, could use any portion of the electromagnetic spectrum, provided an appropriate transmitter, channel, and receiver, could be provided. For instance if a transmitter and receiver pair constructed to transmit and receive in the radio band were provided, a shielded cable could be used to carry the digital signal between the transmitter and receiver. This however, is not the preferred method, as radio interference from other machines in the industrial setting, could affect the quality of the signal being transmitted despite the present of a shielded cable.

Figure 2:
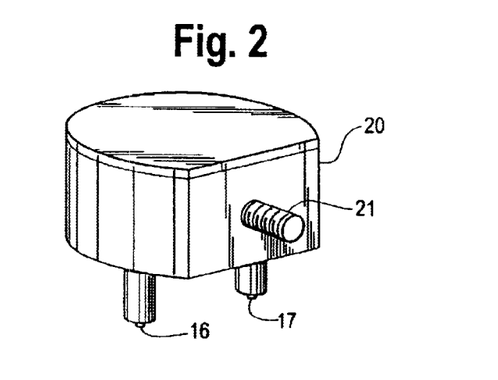
FIG. 2 is a perspective view of the electronics module.
Figure 3:
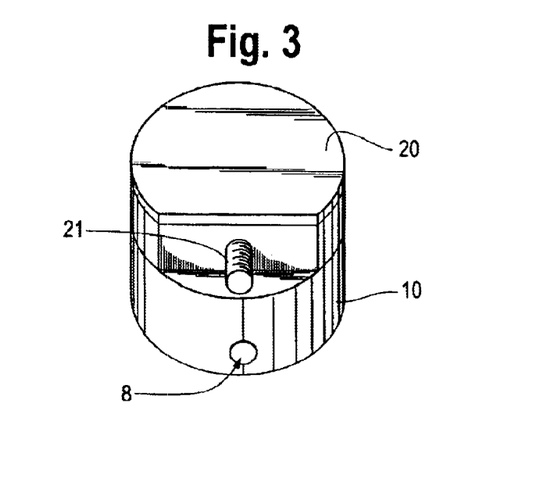
FIG. 3 is a perspective view of the electronics module mounted on the flow meter.

As shown in FIGS. 2 and 3, the electronics module 20 which transmits the flow rate signal may be located on the flow meter 10 and can be removably attached to thereto, allowing for easy replacement of the electronics module. The electronic module 20 can include the sensors 16 and 17. As shown in FIG. 2, the sensors can be mounted on members which distend from the main housing of the electronics module 20. The distending members fit into recesses in the flow meter 10 and allow the sensors 16 and 17 to be in close proximity to the spur gears.

Because the electronics module 20 is potted and electrically isolated, it utilizes a non-replaceable battery as a power source, creating a concern regarding power consumption. To reduce power consumption, the pulses of the LED are very narrow. A typical duty cycle is $1:10^4$ to $10^6$. Pulse width is used to encode direction, and the more narrow pulse width encodes a forward direction, which is more common, whereas a wider pulse width encodes the reverse direction. It is preferred that the narrow pulse width is approximately 0.5 ms, and the wider pulse width is approximately 5.0 ms. Since direction and rate are encoded by one LED, a more power consuming embodiment using two LED's, one each for a direction signal and a rate signal, is avoided.

With reference to FIG. 1, the pulse signal carried by the fiber optic cable 22 is then received at a receiver unit 30 which decodes the information into a pseudo quadrature output to interface to the system controller 31 or other control equipment. The words "pseudo quadrature" are used here to describe the signal because of its short duty cycle. The receiver unit 30 preferably uses a microcontroller to accomplish the conversion, as set forth herein. The pseudo quadrature output signals are carried to the system controller 31 by a shielded bundle of wires 32.

Figure 4:
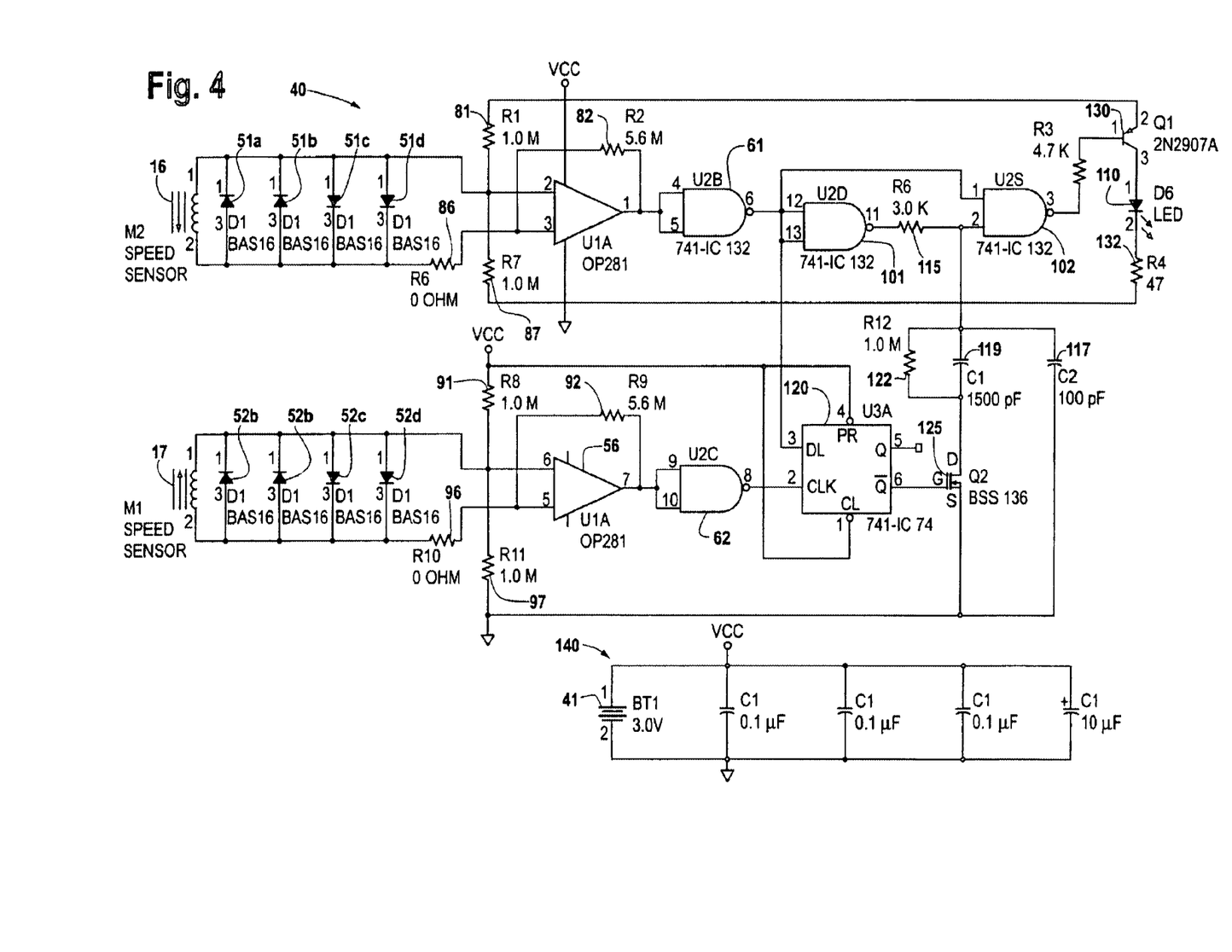
FIG. 4 is a schematic showing the sensors, transmitter, power supply and associated circuitry.

With reference to FIG. 4, the electronics housed in the electronics module 20 receive signals from the first sensor 16 and second sensor 17, which detect the movement of the flow meter spur gears 12*a* or 12*b*. The reluctance sensors 16 and 17 output a sine wave voltage that is proportional to the velocity of the target metal spur gear as it passes the respective sensor. In the preferred embodiment, the frequency of the signal generated by the sensors 16 and 17 is in the range of 1.2 Hz to 475 Hz. The specific range will vary depending upon the flow meter and sensors used. The voltage is typically in the range of millivolts to tens of volts, but can vary with the type of sensor chosen. One skilled in the art will recognize that other types of sensors, generating other types of signals, such as digital signals, may be used, and the down stream electronics adjusted accordingly to use such signals, consistent with the teachings of the invention.

As shown in FIG. 4 the analog electromagnetic signals produced are conveyed electronically to inputs of a transmitter 40 in the electronics module 20. For the input from each sensor, diodes 51*a–d* and 52*a–d* form a redundant voltage clamp to limit the output voltage from the respective sensor. This is advantageous as it makes the design intrinsically safe and protects the input of op-amps 55 and 56 from damage. One skilled in the art will recognize that the components need not be physically located as described here. For instance, the diodes 51*a–d* and 52*a–d* forming the voltage clamp may be located near the sensors 16 and 17, and not on a circuit board holding the transmitter 40 or encoding circuitry. In other words, including the voltage clamping electronics as part of a transmitter is a matter of convenience and not a requirement. The voltage clamping electronics could just as easily be included as part of the sensors 16 and 17 and located there upon or in close proximity thereto.

A signal conditioning section of the transmitter 40 is present for each sensor 16 and 17. With respect to each sensor 16 and 17, the signal conditioning section includes op-apms 55 and 56 and NAND gates 61 and 62 and associated components. Op-amps 55 and 56 and associated components form a comparator with hysteresis. The arrangement of components shown in FIG. 4 provides symmetrical hysteresis while employing only a single supply voltage. With respect to op-amp 55, resistors 81 and 87 bias one side of the sensor network and op-amp input at the midpoint of the DC voltage supply. The sinusoidal input signal from the respective sensor 16 then causes the other op-amp input to cross the threshold set by the bias network. Resistors 82 and 86 and the intrinsic resistance of the sensor control the amount of positive feedback and hence the amount of hysteresis. Resistor 82 is purposely chosen to be large to prevent its current from significantly influencing the 81 and 87 biasing network voltage. With respect to op-amp 56, resistors 91 and 97 perform the biasing, and resistors 92 and 96 provide the control of the positive feedback.

The op-amps 55 and 56 are preferably micro power devices such as model OP281 made by PMI and as such are low frequency devices with weak output stages compared to a traditional type of op-amp. This causes the output to exhibit relatively long rise and fall times that are unsuitable for driving further logic. NAND gates 61 and 62 are preferably Schmitt trigger devices that transform the slew rate limited op-amp outputs into sharp signals that can drive further logic. One skilled in the art will recognize that there are other components that can achieve the same or similar results.

NAND gates 101 and 102 and associated components form a monostable multivibrator that sets the output pulse width which will cause LED 110 to light. The input to this monostable vibrator comes from the signal conditioning circuit associated with one of the sensors 16 or 17. As shown in FIG. 4, the input comes from NAND gate 61 associated with the signal conditioning circuit of the first sensor 16. The output pulse width is determined by the delay caused by the network including resistor 115 and the capacitance from NAND gate 61 to ground. This capacitance includes capacitor 117 which is always in the circuit and capacitor 119 which is switched by the direction flip-flop 120. Resistor 122 prevents leakage through MOSFET 125 from inadvertently charging capacitor 119 when MOSFET 125 is off.

The outputs of both signal conditioning sections are fed into flip-flop 120 which acts as direction detector. When the spur gears 12a and 12b of the flow meter are rotating in one direction, the D input of the flip-flop 120 is always low at the rising edge of the signal delivered to the clock input of the flip-flop 120 from the signal conditioning circuit of the second sensor 17. This causes the flip-flop 120 to output a logic low signal at its output Q. When the spur gears 12a and 12b are rotating the other direction, the D input of flip-flop 120 is always high on the rising edge of the signal delivered to the clock input, causing the flip-flop 120 to output a logic high. The flip-flop 120 inverted output is used to drive MOSFET 125, which switches the pulse width generator between different time constants, thereby generating different pulse widths used to communicate the direction information.

The LED 110 is driven by PNP transistor 130 from the output of the monostable pulse width generator. While the LED 110 may emit in any part of the spectrum, it is preferred that the LED 110 emit in the visible band. Resistor 132 limits the current through the LED 110. The LED 110 is placed in proximity to the fiber optic cable so that the light pulses generated by the LED 110 may be transmitted along the fiber optic cable to a receiver unit.

The components of the transmitter 40 are powered by a power supply isolated from the receiver unit 30. It is preferable that the power supply is a non-replaceable battery 41, as the electronics of the transmitter 40 are potted.

Figure 5:
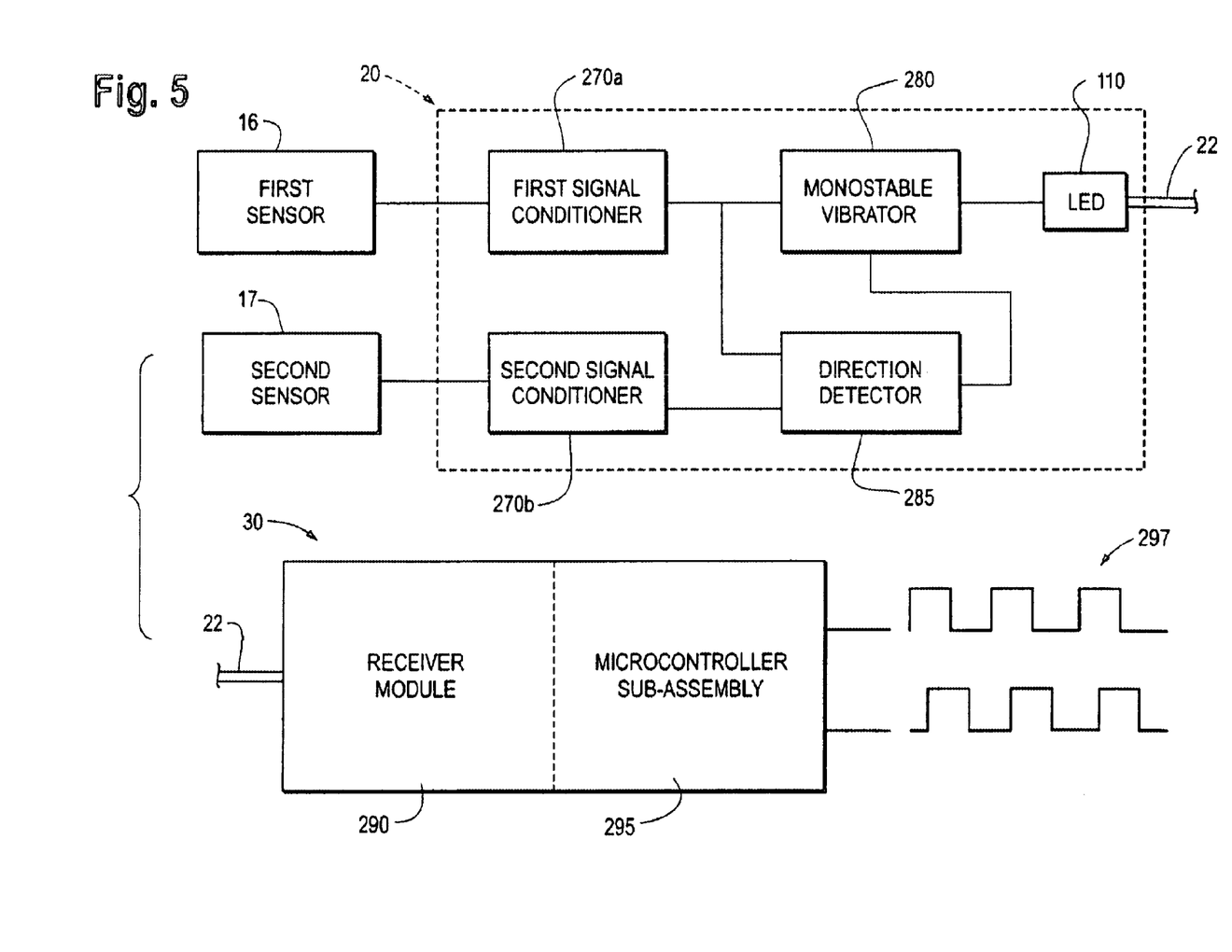
FIG. 5 is a block diagram showing the fiberoptic transceiver in functional blocks.

With reference to FIG. 5, the receiver unit 30 has two sub-assemblies. The first is a shielded receiver module 290 that connects directly to the plastic fiber optic cable 22 and receives the signal transmitted along the fiber optic cable 22. The second sub-assembly is the microcontroller module 295. The micro controller subassembly 295 includes circuitry for processing the received signal into pseudo quadrature signals and includes outputs for sending pseudo quadrature digital signals 297 to the system controller.

Figures 6, 6A:
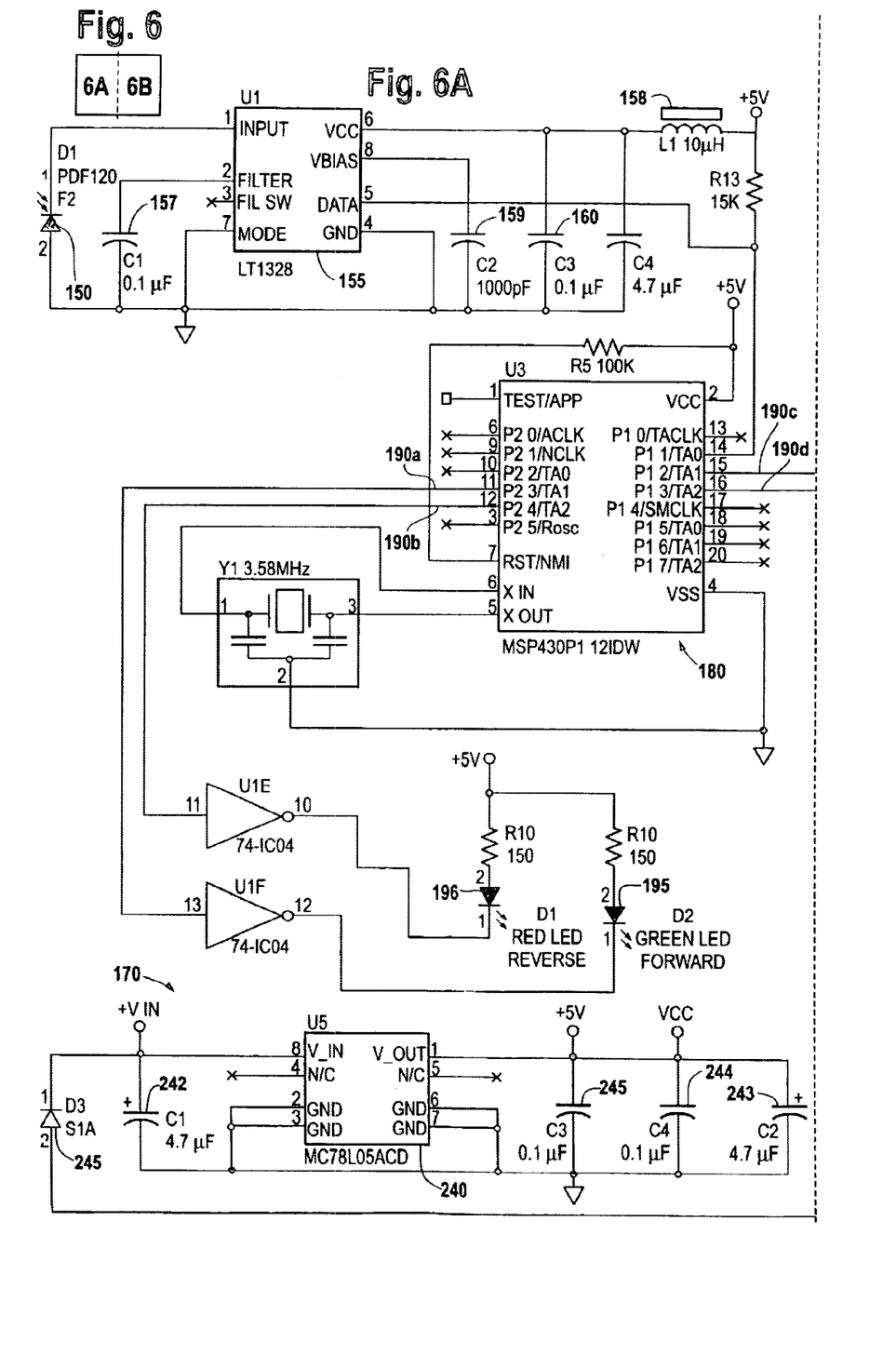
FIG. 6 is a schematic diagram showing the receiver, microcontroller and associated circuitry.
Figure 6B:
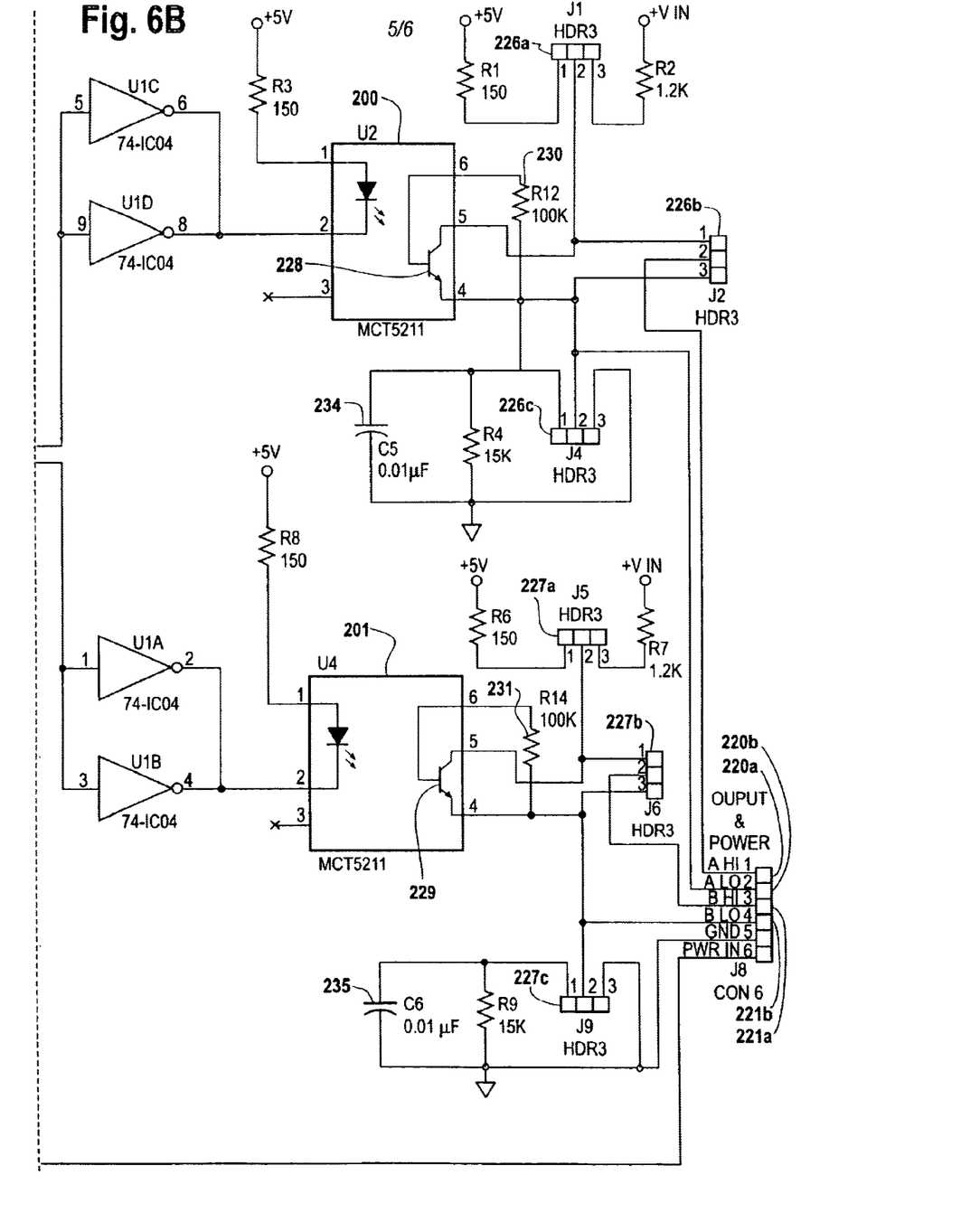

As shown in FIG. 6, the circuitry inside the receiver module 290 includes a photosensor 150, such as a model PDF120F2, electrically connected to the signal input of a receiver chip 155, such as an LT1328, designed as an off-the-shelf solution for infrared data communication between computers and peripherals at up to 4 Mbps. In the present application, this high band width is advantageous in permitting the reception and detection of the narrow pulses transmitted over the fiber optic cable. A capacitor 157 sets the frequency of the high pass filter within the receiver chip 155. The frequency is chosen to minimize any low frequency interference, either electrical or optical, while minimizing pulse width distortion of the intended signal. An inductor 158 and capacitors 159 and 160 form a filter to prevent any noise on the power supply 170 from coupling into the receiver chip 155 and generating a spurious output pulse.

The microcontroller sub-assembly takes the signal generated by the receiver module and processes it to generate pseudo quadrature output. A microcontroller chip 180 and associated components comprise the microcontroller sub-assembly that provides the function of converting the pulse signal of the receiver chip 155. It is preferred that the microcontroller chip 180 is model MSP430P112 manufactured by Texas Instrument, although other microcontrollers may also be used. The pulse conversion functionality desired is contained within the program that continually executes within the microcontroller chip 180. The microprocessor chip 180 provides 4 outputs 190a–d. Output 190a drives a green LED 195 to indicate forward flow at the flow meter, and output 190b drives a red LED 196 to indicate reverse flow. Outputs 190c–d provide the quadrature phase information which is sent to additional circuitry to produce final output signals at quadrature phase outputs 220a–b and 221a–b.

Optoisolators 200 and 201 provide isolation of the microcontroller chip 180 from the quadrature phase outputs 220a–b and 221a–b. The phase outputs 220a–b and 221a–b are configurable in 4 different output configurations as set by jumpers 226a–c and 227a–c. The microcontroller sub assembly can provide signals on the quadrature phase outputs 220a–b and 221a–b in any one of four different formats, to accommodate a wide variety of system controllers which may be connected to the quadrature phase outputs 220a–b and 221a–b.

Figure 7:
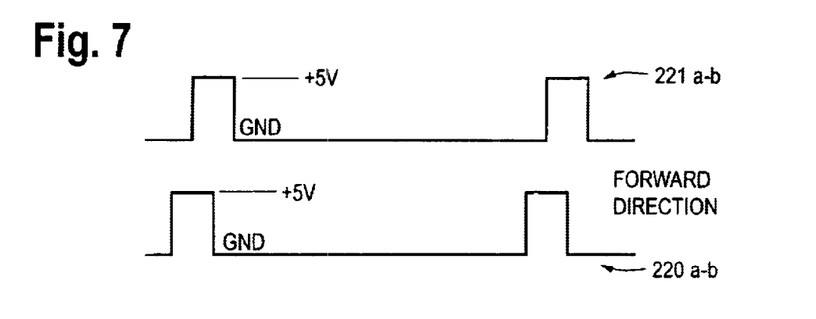
FIG. 7 is a representation of signals available at the pseudo quadrature outputs when the outputs are configured for 5 volt logic output.

In a 5 volt logic output configuration, the output is a 5 volt logic signal regardless of the input supply voltage to the receiver unit 30. Representative output signals on the pseudo quadrature outputs 220a–b and 221a–b for a 5 volt logic signal showing a forward flow at the flow meter are as shown in FIG. 7. Reference ground for the signals is provided by the power supply 170 ground.

Figure 8:
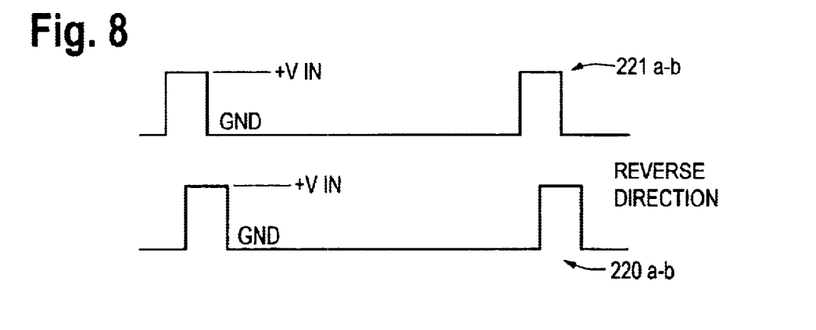
FIG. 8 is a representation of signals available at the pseudo quadrature outputs when the outputs are configured for +Vin logic.

In a +Vin logic configuration the output is a logic signal that tracks the input supply voltage to the receiver unit 30. Representative output signals on the pseudo quadrature outputs 220a–b and 221a–b for a Vin logic signal showing a reverse flow at the flow meter are shown in FIG. 8. Reference ground for the signals is provided by the power supply 170 ground.

Figure 9:
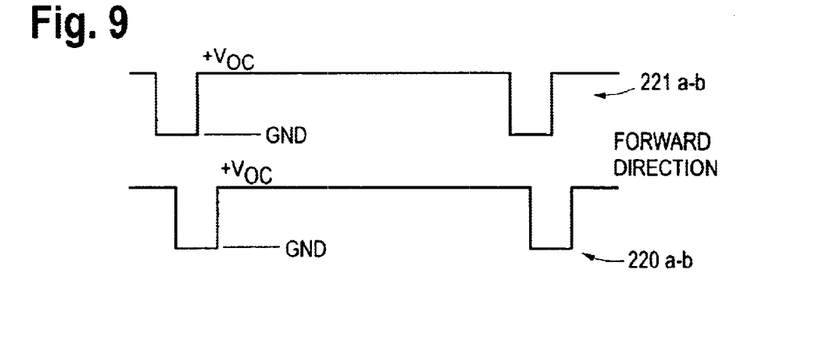
FIG. 9 is a representation of signals available at the pseudo quadrature outputs when the outputs are configured for an open collector output.

In an open collector output configuration, the receiver unit provides access to the collector of the output transistors 228 and 229. The controller system must provide a current limited voltage source (+Voc) to the quadrature phase outputs 220a–b. Representative output signals on the pseudo quadrature outputs 220a–b and 221a–b for the open collector configuration showing a reverse flow at the flow meter are shown in FIG. 9. In this configuration, outputs 220b and 221b are grounded at the receiver ground and outputs 220a and 221a output the signal.

Figure 10:
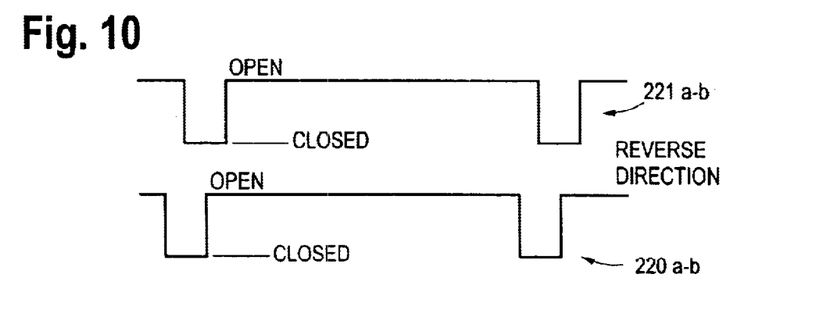
FIG. 10 is a representation of signals available at the pseudo quadrature outputs when the outputs are configured for an isolated output.

In an isolated output configuration, the quadrature phase outputs 220*a–b* and 221*a–b* are galvanically isolated from the receiver unit 30 power supply and the rest of the receiver circuitry. In this configuration the quadrature phase outputs behave like switches except that the current will only flow one way when the switch is closed. The source of the current must be current limited and supplied to the receiver unit 30 from the system controller. Representative output signals on the pseudo quadrature outputs 220*a–b* and 221*a–b* for forward flow at the flow meter are shown in FIG. 10. Outputs 220*a* and 221*a* should be pulled to a higher voltage than 220*b* and 221*b* in order for current to flow.

With reference to FIG. 6, resistors 230 and 231 are provided to improve the output waveforms by speeding up the turn off of the transistors 228 and 229 in the optoisolators 200 and 201. Capacitors 234 and 235 are provided to reduce the effect of crosstalk in the output cable between the two phases of the quadrature signal.

The power supply 170 for the receiver module consists of a voltage regulator 240, such as model MC78L05ACD and associated components. Capacitors 242 and 243 provide the recommended decoupling for regulator stability. Capacitors 244 and 245 act as bypass capacitors for the receiver chip 155 and the micro-controller 180. Diode 245 provides reverse polarity protection.

The general operation of the fiber optic pulse transceiver may be described in block diagram form with reference to FIG. 5. The first sensor 16 and second sensor 17 generate out of phase electromagnetic signals. The signals are fed into an electronics module 20 which contains circuitry for signal conditioning 270, circuitry for a monostable vibrator 280, circuitry for direction detection 285, and a LED 110 for generating a light pulse. The electromagnetic signals generated by each of the first sensor 16 and second sensor 17 are each fed into a signal conditioner 270*a* or 270*b* containing appropriate circuitry. The output of a first signal conditioner 270*a* is fed to the monostable vibrator 280, which includes circuitry for pulse generation. The signal from the first signal conditioner 270*a* is also first fed to a direction detector 275 containing appropriate circuitry. The signal from the second signal conditioner 270*b* is also fed to the direction detector 285. An output signal from the direction detector 285 is fed to the monostable vibrator 280, whose output is then fed to the LED 110 to produce the light pulses of appropriate frequency and width to correspond to the rate and direction of rotation sensed by the first and second sensor 16 and 17. The light pulse travels down a fiber optic cable 22 where it is received by a receiver unit 30. As shown in FIG. 5, the receiver unit 30 contains, in general, two sub-assemblies a receiver module 290, and a microcontroller sub-assembly 295. The receiver module 290 contains appropriate circuitry to receive the light pulse and converts the light signal back into an electric signal. The microcontroller sub-assembly 295 contains appropriate electronics to decode the electric signal fed from the receiver module 290 and output two quadrature signals 297. Those signals may then be fed to further control electronics such as a system controller which may regulate and control the flow of liquid through the spray head.

The specific components used and described herein are meant only as examples, and are not meant to limit the scope of the claimed invention. One skilled in the art will recognize that other components may be used to construct the apparatus and carry out the method consistent with the teachings herein.

We claim:

1. A transceiver for communicating information from a flow meter to a system control unit, including:

two sensors to sense flow rate of fluid through the flow meter, said sensors generating analog signals that are out of phase;

a transmitter connected to the sensors to receive said analog signals, said transmitter converting said analog signals into a single digital signal and communicating said single digital signal to a single communication channel;

a receiver to receive the single digital signal from the communication channel, said receiver converting said signal into two out of phase signals.

2. The transceiver of claim 1, where the analog signals generated by the sensors are 90 degrees out of phase.

3. The transceiver of claim 1 where said single digital signal varies in frequency and pulse width.

4. The transceiver of claim 3 where the single digital signal frequency varies with the flow rate and the pulse width varies with the flow direction.

5. The transceiver of claim 3, where the communication channel is a fiber optic cable.

6. The transceiver of claim 5 wherein the single digital signal is in the form of a light pulse.

7. The transceiver of claim 6 wherein the light pulse is generated by a light emitting diode.

8. The transceiver of claim 7 wherein the light emitting diode emits in the visible range.

9. The transceiver of claim 8 wherein the light emitting diode emits light having a wavelength of 660 nanometers.

10. A method of communicating fluid flow rate information between a flow meter and a controller, including the steps of:

generating two out of phase analog signals in response to the flow rate in the flow meter where the frequency of said analog signal represents the flow rate;

comparing the out of phase analog signals to determine flow direction;

encoding the flow direction and the flow rate into a single digital signal;

transmitting the single digital signal form a first point to a second point;

decoding said single digital signal to extract the flow rate and direction.

11. The method of claim 10, where the step of encoding the analog signals includes making the digital signal frequency proportional to the frequency of one of the out of phase analog signals and making the digital signal pulse width proportional to the flow direction.

12. The method of claim 11, where the step of encoding includes making the pulse width corresponding to a forward flow direction narrower that than the pulse width corresponding to a reverse flow direction.

13. The method of claim 12 where the step of transmitting the single digital signal includes transmitting the signal by electromagnetic radiation.

14. The method of claim 13 where the electromagnetic radiation is in the visible spectrum.

15. The method of claim 14 where the electromagnetic radiation is in the infrared spectrum.

16. The method of claim 15, including the step of providing a fiberoptic cable for transmission of the single digital signal from the first point to the second point.

17. A transceiver for communicating information from flow meter to a system control unit including:

a first sensor associated with said flow meter adapted to sense the rate of movement of said moving body and to generate a first analog signal;

a second sensor associated with said moving body adapted to sense the rate of movement of said moving body and to generate a second analog signal having a frequency corresponding to the rate of movement of said moving body;

a transmitter connected to said first sensor to receive said first signal and connected to said second sensor to receive said second signal, said transmitter adapted to convert said first and second analog signals to a single digital signal;

a communication channel, adapted to receive said single digital signal from said transmitter and transmit same;

a receiver connected to said communication channel adapted to receive said digital signal from said communication channel to convert said single digital signal into two out of phase signals.

18. The transceiver of claim 17, where said communication channel is a fiber optic cable.

19. The transceiver of claim 17, where said single digital signal has frequency and pulse width, said frequency corresponding to the flow rate through said meter, and said pulse width corresponding to the direction of flow in the flow meter.

20. The transceiver of claim 19, where said single digital signal is a light pulse.

21. The transceiver of claim 20, where said light pulse has a frequency of 660 nanometers.

22. The transceiver of claim 21, where said light pulse is generated by a LED.

23. The transceiver of claim 22, where the communication channel is a fiber optic cable.

24. A transceiver for communicating rate of movement and direction of movement information concerning a moving body, including:

a first sensor associated with said moving body adapted to sense the rate of movement of said moving body and to generate a first signal having a frequency corresponding to the rate of movement of said moving body;

a second sensor associated with said moving body adapted to sense the rate of movement of said moving body and to generate a second signal having a frequency corresponding to the rate of movement of said moving body;

to said a transmitter connected to said first sensor to receive said first signal and connected second sensor to receive said second signal, said transmitter adapted to convert said first and second signals to a single signal;

a communication channel, adapted to receive said single signal from said transmitter and transmit same;

a receiver connected to said communication channel adapted to receive said digital signal from said communication channel to convert said single digital signal into two out of phase signals.

25. The transceiver of claim 24, where said first signal and said second signal are out of phase.

26. The transceiver of where said signal is conveyed by light.

27. The transceiver of claim 26, where said communication channel is fiber optic cable.

28. The transceiver of claim 25, where said single signal is a digital signal having frequency and pulse width, said frequency corresponding to the rate of movement of said moving body and said pulse width corresponding to said direction of movement of said moving body.

29. The transceiver of claim 25, where said first and second signals are analog signals.

30. The transceiver of claim 25, where said transmitter includes a direction detector to receive said first and second signals and produce an output signal corresponding to the direction of movement of said moving body.

31. The transceiver of claim 28, where single signal is conveyed by light and generated by a light emitting diode.

32. The transceiver of claim 24, where said transmitter is electrically isolated from said receiver.

33. The transceiver of claim 32, where said transmitter includes a signal conditioner, providing a symmetrical hysteresis while utilizing a single power supply.

* * * * *